(12) United States Patent
Park

(10) Patent No.: US 9,118,964 B2
(45) Date of Patent: Aug. 25, 2015

(54) BROADCAST TRANSMITTING APPARATUS, BROADCAST RECEIVING APPARATUS, AND THE METHOD THEREOF

(71) Applicant: SAMSUNG ELECTRONICS CO., LTD., Suwon-si (KR)

(72) Inventor: Hwan-sung Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/084,669

(22) Filed: Nov. 20, 2013

(65) Prior Publication Data

US 2014/0173678 A1 Jun. 19, 2014

(30) Foreign Application Priority Data

Dec. 17, 2012 (KR) .................. 10-2012-0147630

(51) Int. Cl.
*H04N 7/173* (2011.01)
*H04N 21/4425* (2011.01)
*H04H 20/00* (2009.01)
*H04N 21/235* (2011.01)
*H04N 21/236* (2011.01)
*H04N 21/434* (2011.01)

(52) U.S. Cl.
CPC .......... *H04N 21/4425* (2013.01); *H04H 20/00* (2013.01); *H04N 21/235* (2013.01); *H04N 21/23605* (2013.01); *H04N 21/4343* (2013.01)

(58) Field of Classification Search
USPC .................. 725/131, 116, 93, 70, 68, 63, 62; 348/461, 462, 466, 474, 516, 522, 553, 348/569, 608, 636, 656, 680, 693, 706, 719, 348/723, 726, 729

See application file for complete search history.

(56) References Cited

U.S. PATENT DOCUMENTS

| | | | |
|---|---|---|---|
| 7,840,882 B2* | 11/2010 | Lee et al. | 714/784 |
| 2002/0118608 A1* | 8/2002 | Oishi | 369/1 |
| 2006/0062546 A1* | 3/2006 | Hamada | 386/46 |
| 2006/0222328 A1* | 10/2006 | Akahane | 386/83 |
| 2008/0068391 A1* | 3/2008 | Choi et al. | 345/522 |
| 2009/0021641 A1* | 1/2009 | Matsuura et al. | 348/553 |
| 2011/0083148 A1* | 4/2011 | Sakaguchi et al. | 725/39 |
| 2011/0197233 A1* | 8/2011 | Paik et al. | 725/62 |
| 2011/0200146 A1* | 8/2011 | Ikeda et al. | 375/316 |
| 2012/0033034 A1* | 2/2012 | Otsuka et al. | 348/42 |
| 2012/0260198 A1* | 10/2012 | Choi et al. | 715/761 |

* cited by examiner

*Primary Examiner* — Jefferey Harold
*Assistant Examiner* — Mustafizur Rahman
(74) *Attorney, Agent, or Firm* — Sughrue Mion, PLLC

(57) ABSTRACT

A broadcast receiving apparatus is disclosed. The broadcast receiving apparatus includes a receiver configured to receive a broadcast signal which includes video data; a detector configured to detect error information for determining whether there is an error in a packet identifier information, regarding the video data and correction information for correcting the packet identifier information; and a controller configured to detect the packet identifier information using the correction information, and detect the video data using the corrected packet identifier information, when it is determined that the error occurs in the packet identifier information.

19 Claims, 8 Drawing Sheets

FIG. 4

| Syntax | No. of bits | Mnemonic |
|---|---|---|
| TS_program_map_section(){ | | |
|     table_id | 8 | uimsbf |
|     section_syntax_indicator | 1 | bslbf |
|     '0' | 1 | bslbf |
|     reserved | 2 | bslbf |
|     section_length | 12 | uimsbf |
|     program_number | 16 | uimsbf |
|     reserved | 2 | bslbf |
|     version_number | 5 | uimsbf |
|     current_next_indicator | 1 | bslbf |
|     section_number | 8 | uimsbf |
|     last_section_number | 8 | uimsbf |
|     reserved | 3 | bslbf |
|     PCR_PID | 13 | uimsbf |
|     reserved | 4 | bslbf |
|     program_info_length | 12 | uimsbf |
|     for(i=0; i<N; i++){ | | |
|         descriptor() | | |
|     } | | |
|     for(i=0; i<N1; i++){ | | |
|         stream_type | 8 | uimsbf |
|         reserved | 3 | bslbf |
|         elementary_PID | 14 | uimsbf |
|         reserved | 4 | bslbf |
|         ES_info_length | 12 | uimsbf |
|         for(i=0; i<N2; i++){ | | |
|             descriptor() | | |
|         } | | |
|     } | | |
|     CRC_32 | 32 | rpchof |
| } | | |

(ES loop refers to the for(i=0; i<N1; i++) block)

FIG. 5

| Syntax | No. of bits | Mnemonic |
|---|---|---|
| TS_program_map_section(){ | | |
|   table_id | 8 | uimsbf |
|   section_syntax_indicator | 1 | bslbf |
|   '0' | 1 | bslbf |
|   reserved | 2 | bslbf |
|   section_length | 12 | uimsbf |
|   program_number | 16 | uimsbf |
|   reserved | 2 | bslbf |
|   version_number | 5 | uimsbf |
|   current_next_indicator | 1 | bslbf |
|   section_number | 8 | uimsbf |
|   last_section_number | 8 | uimsbf |
|   reserved | 3 | bslbf |
|   PCR_PID | 13 | uimsbf |
|   reserved | 4 | bslbf |
|   program_info_length | 12 | uimsbf |
|   for(i=0; i<N; i++){ | | |
|     descriptor() | | |
|   } | | |
|   for(i=0; i<N1; i++){ | | |
|     stream_type | 8 | uimsbf |
|     reserved | 3 | bslbf |
|     elementary_PID | 14 | uimsbf |
|     reserved | 4 | bslbf |
|     ES_info_length | 12 | uimsbf |
|     for(i=0; i<N2; i++){ | | |
|       descriptor() | | |
|     } | | |
|   } | | |
|   CRC_32 | 32 | rpchof |
| } | | |

CORRECTION INFORMATION → reserved (3 bits), reserved (4 bits)

FIG. 6

| Syntax | No. of bits | Mnemonic |
|---|---|---|
| TS_program_map_section(){ | | |
|   table_id | 8 | uimsbf |
|   section_syntax_indicator | 1 | bslbf |
|   '0' | 1 | bslbf |
|   reserved | 2 | bslbf |
|   section_length | 12 | uimsbf |
|   program_number | 16 | uimsbf |
|   reserved | 2 | bslbf |
|   version_number | 5 | uimsbf |
|   current_next_indicator | 1 | bslbf |
|   section_number | 8 | uimsbf |
|   last_section_number | 8 | uimsbf |
|   reserved | 3 | bslbf |
|   PCR_PID | 13 | uimsbf |
|   reserved | 4 | bslbf |
|   program_info_length | 12 | uimsbf |
|   for(i=0; i<N; i++){ | | |
|     descriptor() | | |
|   } | | |
|   for(i=0; i<N1; i++){ | | |
|     stream_type | 8 | uimsbf |
|     reserved | 3 | bslbf |
|     elementary_PID | 14 | uimsbf |
|     reserved | 4 | bslbf |
|     ES_info_length | 12 | uimsbf |
|     for(i=0; i<N2; i++){ | | |
|       descriptor() | | |
|     } | | |
|   } | | |
|   CRC_32 | 32 | rpchof |
| } | | |

...
stream_type = video
elementary_PID = 0x21
reserved = 0x03
...

...
stream_type = audio
elementary_PID = 0x22
reserved = 0x03
...

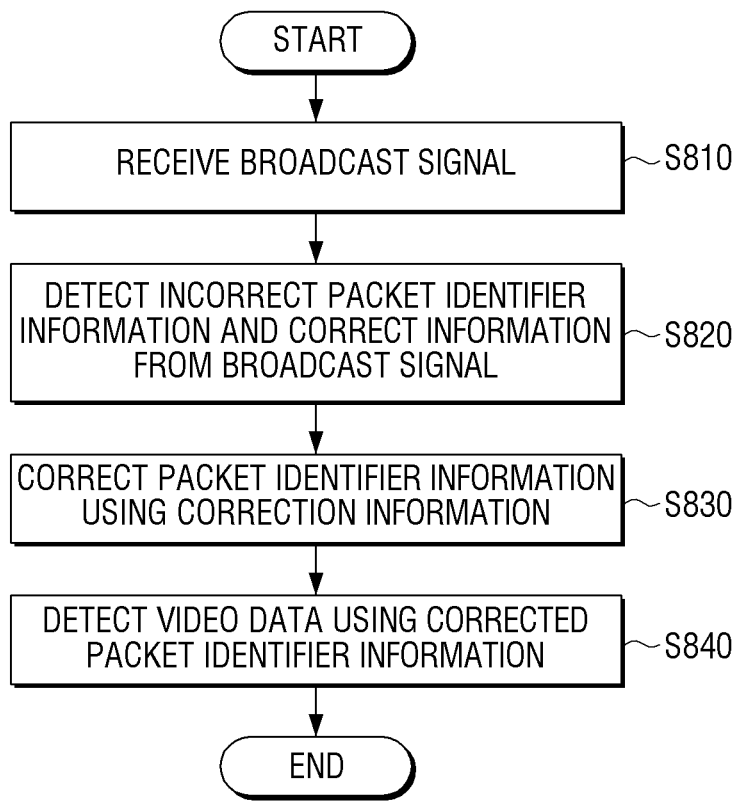

BROADCAST TRANSMITTING APPARATUS, BROADCAST RECEIVING APPARATUS, AND THE METHOD THEREOF

CROSS-REFERENCE TO RELATED APPLICATIONS

This application claims priority from Korean Patent Application No. 10-2012-0147630, filed on Dec. 17, 2012, in the Korean Intellectual Property Office, the disclosure of which is incorporated herein by reference.

BACKGROUND

1. Field

Methods and apparatuses consistent with the exemplary embodiments relate to a broadcast transmitting apparatus, a broadcast receiving apparatus, and a method thereof. More particularly, exemplary embodiments relate to a broadcast transmitting apparatus, which may transmit/receive a digital broadcast, and a broadcast receiving apparatus and a method thereof.

2. Description of the Related Art

In a related art, digital broadcasting has an advantage of providing high definition broadcasting, due to excellent transmission efficiency two-way services, such as a VOD service, etc. Accordingly, in Korea, skywave analogue broadcasting will come to an end in 2013, and will be converted to digital broadcasting. Cable TVs also will convert to digital broadcasting. Further, digital skywave broadcasting adopts ATSC methods, while digital cable broadcasting will be transmitting in a QAM (Quadrature amplitude modulation) method.

However, in the related art, approximately $2/3$ of cable broadcasting receivers are analogue cable broadcasting receivers. Thus, in order to convert analogue cable broadcasting receivers to digital cable broadcasting in the related art, it is essential to install set top boxes, etc., and pay expensive subscription fees. Accordingly, in order to expand digital cable broadcasting to low income classes in the related art, a Clear QAM has been introduced. A Clear QAM is a signal which may be transmitted without scrambling. Thus, the clear QAM enables one to view digital cable broadcasting free of charge through a TV where a digital broadcasting receiver is embedded.

However, in a case of transmitting all broadcasting contents or channels by the clear QAM in the related art, there is a problem that a cable operator cannot differentiate service ratings between paid subscribers and free subscribers. Accordingly, there is a need for a method which may differentiate service ratings between paid subscribers and free subscribers, regarding broadcasting signals transmitted by the Clear QAM.

SUMMARY

Exemplary embodiments may provide a broadcast transmitting apparatus, which enables differentiating service ratings, per contents or channel regarding broadcast signals transmitted as Clear QAM, and a broadcast receiving apparatus, and a method thereof.

According to an aspect of an exemplary embodiment, a broadcast receiving apparatus may include a receiver which receives a broadcast signal which includes video data; a detector which detects error information for determining whether there is an error in packet identifier information, regarding the video data and correction information for correcting the packet identifier information; and a controller which corrects the packet identifier information using the correction information, and detects the video data using the corrected packet identifier information, when it is determined that the error occurs in the packet identifier information.

In addition, the broadcast receiving apparatus may further include a signal processor which signal processes the detected video data; and a displayer which outputs the signal processed video data.

Herein, the correction information may be inserted into a reserved area of a PMT (Program Map Table) of the broadcast signal.

In addition, the broadcast signal may be a Clear QAM (Quadrature amplitude modulation) signal.

In addition, the broadcast signal may further include audio data, and the detector may detect the error information for determining whether there is the error in the packet identifier information, regarding the audio data and the correction information for correcting the packet identifier information, from the broadcast signal, and the controller may correct the packet identifier information regarding the audio data using the correction information, and may detect the audio data using the corrected packet identifier information, when it is determined that the error occurs in the packet identifier information regarding the audio data.

According to an aspect of an exemplary embodiment, a broadcast receiving method may include receiving a broadcast signal which includes video data; detecting error information for determining whether there is an error in packet identifier information, regarding the video data and correction information for correcting the packet identifier information, from the broadcast signal; correcting the packet identifier information using the correction information, when it is determined that the error occurs in the packet identifier information; and detecting the video data using the corrected packet identifier information.

In addition, the broadcast receiving may further include signal processing the detected video data; and outputting the signal processed video data.

Herein, the correction information may be inserted into a reserved area of a PMT (Program Map Table) of the broadcast signal.

Furthermore, the broadcast signal may be a Clear QAM (Quadrature amplitude modulation) signal.

In addition, the broadcast signal may further include audio data, and the broadcast receiving method may further include detecting the error information for determining whether there is the error in the packet identifier information, regarding the audio data and the correction information for correcting the packet identifier information, from the broadcast signal; correcting the packet identifier information regarding the audio data using the correction information, when it is determined that the error occurs in the packet identifier information regarding the audio data; and detecting the audio data using the corrected packet identifier information.

According to an aspect of an exemplary embodiment, a broadcast transmitting apparatus may include a broadcast signal generator which generates a broadcast signal which includes video data; and a transmitter which transmits the broadcast signal, wherein the broadcast signal comprises error information for determining whether there is an error in packet identifier information, regarding the video data and correction information for correcting the packet identifier information.

Herein, the correction information may be inserted into a reserved area of a PMT (Program Map Table) of the broadcast signal.

In addition, the broadcast signal may be a Clear QAM (Quadrature amplitude modulation) signal.

According to an aspect of an exemplary embodiment, a broadcast transmitting method may include generating a broadcast signal which includes video data; inserting error information, for determining whether there is an error in packet identifier information, regarding the video data and correction information for correcting the packet identifier information, into the broadcast signal; and transmitting the broadcast signal.

In addition, the broadcast signal may be a Clear QAM (Quadrature amplitude modulation) signal.

According to an aspect of an exemplary embodiment, a broadcast transmitting method may include generating a broadcasting signal which includes video data; inserting correction information into a PMT (Program Map Table) of the broadcast signal; and transmitting the broadcast signal, wherein the broadcast signal comprising the correction information indicates that there is an error in packet identifier information of the broadcast signal regarding the video data.

According to the aforementioned various exemplary embodiments, the broadcast operator may differentiate the service ratings, per contents or channel regarding the broadcast signal transmitted, as well as Clear QAM.

BRIEF DESCRIPTION OF THE DRAWINGS

The above and/or other aspects of the exemplary embodiments will be more apparent by describing certain exemplary embodiments with reference to the accompanying drawings, in which:

FIG. 4 is a view for explaining a structure of a PMT;

FIG. 5 is a view for explaining an area where correction information is included;

FIG. 6 is a view illustrating a specific example of packet identifier information and correction information included in a PMT;

FIG. 8 is a flowchart for explaining a broadcast receiving method according to an exemplary embodiment.

DETAILED DESCRIPTION OF THE EXEMPLARY EMBODIMENTS

Certain exemplary embodiments are described in detail below with reference to the accompanying drawings.

Figure 1:
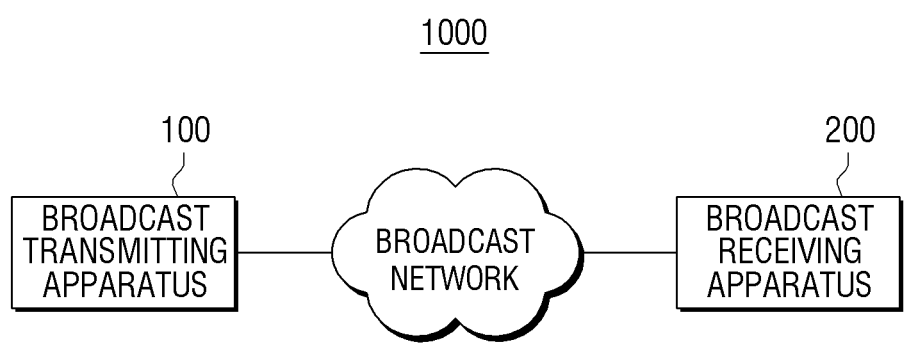
FIG. 1 is a view illustrating a broadcast transceiving system according to an exemplary embodiment.

FIG. 1 is a view illustrating a broadcast transceiving system according to an exemplary embodiment. According to FIG. 1, the broadcast transceiving system 1000 includes a broadcast transmitting apparatus 100 and a broadcast receiving apparatus 200.

The broadcast transmitting apparatus 100 generates a broadcast signal and transmits the broadcast signal to the broadcast receiving apparatus 200 through a broadcast network. The broadcast signal may include video data, audio data, and additional data (subtitles, meta data, signaling data, etc.) More specifically, the broadcast transmitting apparatus 100 may packetize an ES (Elementary Stream) for each of the video, audio, and additional data included in each contents or channel, multiplex the packetized ES, and generate broadcast signals having transport stream formats. The transport stream may go through processing, such as encoding, modulation, etc., to be suitable to the transmitting environment, and be transmitted through the broadcast network. The broadcast transmitting apparatus 100 may transmit a broadcast signal in a QAM (Quadrature amplitude modulation) method. The QAM is one of the modulation methods of digital signals. In Korea, a digital cable broadcast is transmitted using QAM methods.

In a related art, a broadcast signal includes packet identifier information of a packet where video data and audio data are included, regarding each ES in a PMT (Program Map Table). A related art broadcast receiving apparatus may use the packet identifier information to detect the packet where video data and audio data are included, and perform signal processing thereby outputting data. However, the broadcast transmitting apparatus 100, according to an exemplary embodiment, may insert error information for determining whether or not there is an error in the packet identifier information, and correction information for correcting the packet identifier information regarding the video data and audio data included in the broadcast signal, and transmit the result in a method predetermined with the broadcast receiving apparatus. When there is an error in the packet identifier information, a related art broadcast receiving apparatus would use incorrect packet identifier information regarding the video data and audio data to process the data, and even if it detects correction information, the related art broadcast receiving apparatus would not be able to output contents normally, since the related art broadcast receiving apparatus does not know a way to correct the packet identifier information.

A broadcast receiving apparatus 200, according to an exemplary embodiment, may detect error information for determining whether or not there is an error in the packet identifier information, and correction information regarding the video data and audio data included in the received broadcast signal. If it is determined that there is an error in the packet identifier information, the broadcast receiving apparatus 200 may correct the packet identifier information using the method included with the broadcast transmitting apparatus. Therefore, the broadcast receiving apparatus 200 is able to process the video data and audio data, and output the contents normally using the corrected packet identifier information.

The broadcast receiving apparatus 200 may be embodied as various types of apparatuses capable of receiving broadcast, such as set top boxes, TVs, and smart phones, etc.

Figure 2:
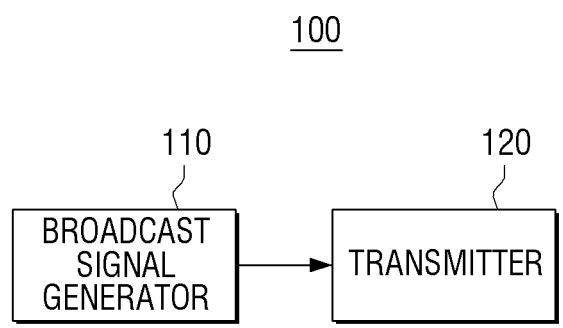
FIG. 2 is a block diagram illustrating a configuration of a broadcast transmitting apparatus according to an exemplary embodiment.

FIG. 2 is a block diagram illustrating a configuration of a broadcast transmitting apparatus according an exemplary embodiment. According to FIG. 2, the broadcast transmitting apparatus 100 includes a broadcast signal generator 110 and a transmitter 120.

The broadcast signal generator 110 generates a broadcast signal which includes video data. The broadcast signal may include audio data and additional data, as well as video data. The broadcast signal generator 110 may go through processes, such as encoding, etc., regarding the video, audio, and additional data included in each contents or channel, and generate an ES (Elementary Stream). The broadcast signal generator 110 may packetize each ES (Elementary Stream), multiplex the packetized ES, and generate broadcast signals having a transport stream format.

The broadcast signal generator 110 may insert error information for determining whether or not there is an error in the packet identifier information, and correction information for correcting the packet identifier information regarding the video data. The error information and correction information may be inserted into the PMT. The PMT is data for defining the packet identifier of the video/audio data for each contents or channel. Correction information may be inserted into a reserved area of the PMT. The error information may be inserted into the reserved area of the PMT, regardless of the error information. Alternatively, the correction information itself may be used as error information. In other words, the broadcast receiving apparatus may determine that there is an error in the packet identifier when correction information is included in the broadcast signal. In a case where the correction information is used as the error information, only the correction information may be inserted into the broadcast signal.

The transmitter 120 transmits the broadcast signal, generated in the broadcast signal generator 100, through a broadcast network. More specifically, the transmitter 120 may perform processing, such as encoding, modulation, etc., to the broadcast signal in the transmitting environment, and then transmit the broadcast signal.

The transmitter 120 may transmit the broadcast signal in a QAM (Quadrature amplitude modulation) method, e.g., a Clear QAM signal which does not go through a scrambling process.

Figure 3:
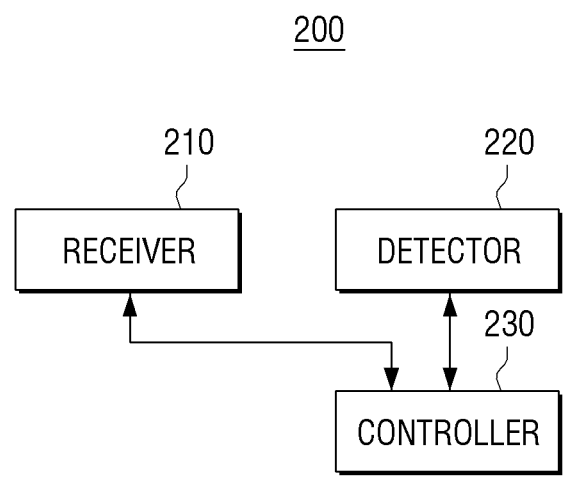
FIG. 3 is a block diagram illustrating a configuration of a broadcast receiving apparatus according to an exemplary embodiment

FIG. 3 is a block diagram illustrating a configuration of a broadcast receiving apparatus according to an exemplary embodiment. According to FIG. 3, the broadcast receiving apparatus 200 includes a receiver 210, detector 220, and controller 230.

The receiver 210 transmits a broadcast signal which includes video data. The broadcast signal may include audio data and additional data, as well as video data.

The detector 220 detects error information for determining whether or not there is an error, and correction information for correcting the packet identifier information regarding the video data from the broadcast signal. More specifically, the detector 220 may detect packet identifier information and correction information included in the PMT. Correction information and error information may be detected from the reserved area of the PMT.

In a case where audio data is included in the broadcast signal, the detector 220 may detect error information for determining whether or not there is an error in the packet identifier information, and correction information for correcting the packet identifier information regarding the audio data.

The controller 230 controls the overall operations of the broadcast receiving apparatus 200. When it is determined that there is an error in the packet identifier information, the controller 230 corrects the packet identifier information using the detected correction information. The correction information itself may be used as the error information. In other words, when the correction information is included in the broadcast signal, the controller 230 may determine that there is an error in the packet identifier information. The controller 230 may correct the packet identifier in various methods, using the correction information. In addition, the controller 230 may detect the video data and/or audio data included in the broadcast signal using the corrected packet identifier information. Operations of the controller 230 will be explained in more detail with reference to FIGS. 4 to 6.

FIG. 4 is a view for explaining a structure of a PMT. With reference to FIG. 4, the PMT includes an ES loop for defining each ES, and the ES loop may be defined for each ES. Therefore, the ES loop may be defined for the number of ES. The ES may include information on the stream type (e.g., MPEG2-video or AC3-audio), and information on the packet identifier of the SE, etc. Within the ES loop, the packet identifier information of the packet included in the video or audio data may be included in the elementary PID.

FIG. 5 is a view for explaining an area where correction information is included. According to FIG. 5, correction information may be included in a reserved area of the PMT. The reserved area refers to an area reserved for use in various purposes according to a user needs. In FIG. 5, correction information is included in the reserved area within the ES loop, but the correction information may also be included within various reserved areas within the PMT, besides the reserved within the ES loop.

FIG. 6 is a view illustrating a specific example of the packet identifier information and correction information included in the PMT. With reference to FIG. 6, the first ES loop 10 is an ES loop regarding video ES, and the second ES loop 20 is an ES loop regarding audio ES. In the first ES loop 10, the packet identifier defined as elementary_PID is 0x21, and the reserved area representing the correction information is defined as 0x03. In the second ES loop 20, the elementary_PID which represents the packet identifier where audio data is included is defined as 0x22, and the reserved area which represents the correction information is defined as 0x03. The packet identifier information included within the first ES loop 10 and the second ES loop 20 includes information on a packet, different from the packet where the actual video or audio data is included.

The controller 230 may correct the incorrect packet identifier information regarding the video data and audio data, using the correction information. For example, as shown in FIG. 6, in a case where the packet identifier information of the video data and audio data is defined as 0x21 and 0x22, and the correction information included in the reserved area is 0x03, correction information may be added to the packet identifier information of the video data and audio data. Therefore, the correction information may be added to the packet identifier information at 0x24 and 0x25, respectively. In addition, the controller 230 may control to detect and process the packet having a packet identifier of 0x24 and 0x25.

In FIG. 6, the correction information included in the reserved area of each ES loop is same as 0x03, but correction information for the video data and audio data may be different from each other. In addition, in the aforementioned exemplary embodiment, the packet identifier information and correction information regarding the video data and audio data is added to correct the packet identifier information, but the actual packet identifier information may be corrected through various other methods. For example, the controller 230 may correct the packet identifier information by subtracting the correction information from the packet identifier information. Alternatively, it is possible to correct the packet identifier information by performing a logical operation (AND, OR, XOR, etc.) regarding the bit including the packet identifier information and correction information.

The broadcast receiving apparatus 200 may further include a signal processor (not illustrated) which signal processes the data included in the broadcast signal according to a control by the controller 230, and an outputter (not illustrated) which outputs the signal processed data. More specifically, the signal processor may include a video processor for processing the video data, and an audio processor for processing the audio data. The video data processor may use the corrected packet identifier to perform processing, such as decoding, scaling, frame rate conversion, etc., to the detected video data and provide the result to the outputter. The audio data processor may use the corrected packet identifier to perform processing, such as decoding, etc., to the detected audio data, and provide the result to the outputter.

The outputter (not illustrated) includes a displayer for displaying video data input in the video processor, and an audio outputter for outputting audio data input in the audio processor. The displayer may be embodied as various display panels, such as a Liquid Crystal Display (LCD), Organic Light Emitting Display (OLED), or Plasma Display Panel (PDP), and the audio outputter may be embodied as audio output apparatus, such as a speaker, etc.

According to the aforementioned exemplary embodiment, a cable operator may insert correct packet identifier information or incorrect packet identifier information and correction information, within the PMT per each channel of the digital cable broadcasting, thereby differentiating the ratings between paid and free subscribers and providing cable broadcasting services. All the users may use contents or channels where correct packet identifier information is included for free. However, regarding contents or channels where incorrect packet identifier information or correction information are included, only set top boxes or TVs which may correct the incorrect packet identifier using correction information are able to reproduce contents normally.

The cable operator may provide a module to a paid subscriber, which may be installed onto a set top box or a TV. The module is capable of correcting the incorrect packet identifier, or provide a program to a paid subscriber which may correct an incorrect packet identifier. The program is capable of being executed in a broadcast receiving apparatus. The broadcast receiving apparatus may be a set top box, TV, smart phone, etc.

Figure 7:
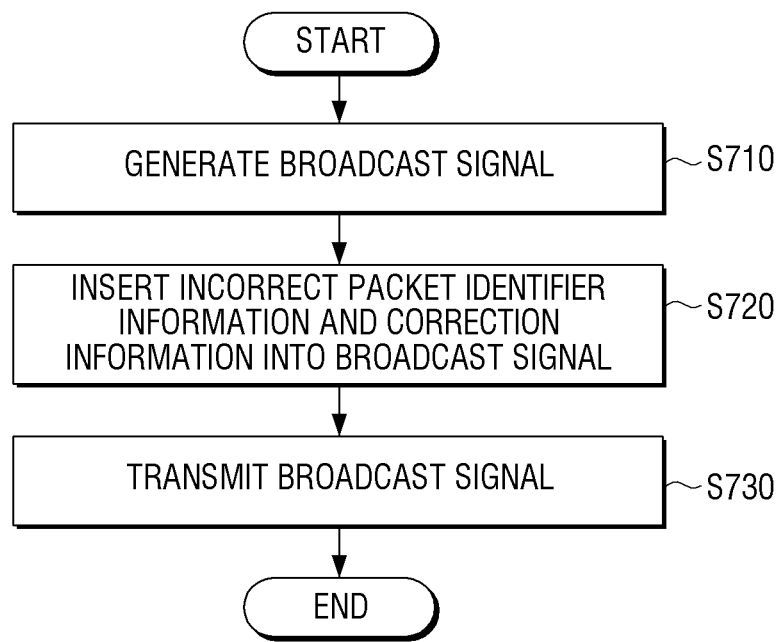
FIG. 7 is a flowchart for explaining a broadcast transmitting method according to an exemplary embodiment.

FIGS. 7-8 explain a broadcast transmitting/receiving method of the broadcast transmitting apparatus 100 and broadcast receiving apparatus 100. For convenience, repetitive information is omitted.

FIG. 7 is a flowchart for explaining a broadcast transmitting method according to an exemplary embodiment. According to FIG. 7, the broadcast transmitting apparatus 100 generates a broadcast signal which includes video data (S710). The broadcast signal may further include audio data and additional video data, and may be a Clear QAM signal. In addition, error information, for determining whether or not there is error information in the packet identifier information regarding the video data and correction information for correcting the packet identifier information, is inserted into the broadcast signal (S720). The correction information and error information may be inserted into the PMT of the broadcast signal, e.g., into a reserved area of the PMT. The correction information itself may be used as error information. Therefore, only correction information may be inserted. In a case where the broadcast signal includes audio data, error information, for determining whether or not there is an error in the packet identifier information regarding the audio data and correction information, may be inserted. Then, the broadcast signal is transmitted (S730).

FIG. 8 is a flowchart for explaining a broadcast receiving method according to an exemplary embodiment. According to FIG. 8, the broadcast receiving apparatus 200 receives a broadcast signal, which includes video data (S810). The broadcast signal may be a Clear QAM signal, and may further include audio data and additional data. In addition, error information, for determining whether or not there is an error in the packet identifier information regarding the video data and correction information for correcting the packet identifier information, is detected from the broadcast signal (S820). The correction information and error information may be detected from the PMT of the broadcast signal, e.g., from the reserved area of the PMT. In a case where the correction information is used as the error information, only the correction information may be detected. The packet identifier information may be corrected using the correction information (S830). More specifically, when it is determined that there is an error in the packet identifier information, the packet identifier information may be corrected using the correction information. In a case where the correction information is used as the error information, e.g., when the correction information is included in the broadcast signal, it may be determined that there is an error in the packet identifier information. In addition, video data is detected using the corrected packet identifier information (S840). The detected video data is signal processed, and the signal processed video data may be output through the displayer.

In a case where audio data is included in the broadcast signal, it is possible to detect error information for determining whether or not there is an error in the packet identifier information regarding the audio data from the received broadcast signal, and correct the packet identifier information regarding the audio data using the correction information regarding the audio data. The audio data may be detected using the corrected packet identifier information.

Although a few embodiments of the exemplary embodiments have been shown and described, it would be appreciated by those skilled in the art that changes may be made in this embodiment without departing from the principles and spirit of the exemplary embodiments, the scope of which is defined in the claims and their equivalents.

What is claimed is:

1. A broadcast receiving apparatus comprising:
   a receiver configured to receive a broadcast signal which comprises video data;
   a detector configured to detect error information for determining whether there is an error in packet identifier information, regarding the video data and correction information for correcting the packet identifier information; and
   a controller configured to correct the packet identifier information using the correction information, and detect the video data using the corrected packet identifier information, when it is determined that the error occurs in the packet identifier information
   wherein the error is inserted to the packet identifier information to distinguish the broadcast receiving apparatus which is capable of correcting the packet identifier formation.

2. The broadcast receiving apparatus according to claim 1, further comprising:
   a signal processor configured to signal process the detected video data; and
   a displayer configured to output the signal processed video data.

3. The broadcast receiving apparatus according to claim 1, wherein the correction information is inserted into a reserved area of a PMT (Program Map Table) of the broadcast signal.

4. The broadcast receiving apparatus according to claim 1, wherein the broadcast signal is a Clear QAM (Quadrature amplitude modulation) signal.

5. The broadcast receiving apparatus according to claim 1, wherein the broadcast signal further comprises audio data, and
   wherein the detector detects the error information for determining whether there is the error in the packet identifier information, regarding the audio data and the correction information for correcting the packet identifier information, from the broadcast signal, and wherein the controller corrects the packet identifier information regarding the audio data using the correction information, and detects the audio data using the corrected packet identifier information, when it is determined that the error occurs in the packet identifier information regarding the audio data.

6. A broadcast receiving method comprising:
receiving a broadcast signal which comprises video data;
detecting error information for determining whether there is an error in packet identifier information, regarding the video data and correction information for correcting the packet identifier information, from the broadcast signal;
correcting the packet identifier information using the correction information, when it is determined that the error occurs in the packet identifier information; and
detecting the video data using the corrected packet identifier information
wherein the error is inserted to the packet identifier information distinguish a broadcast receiving apparatus receiving the broadcast signal which is capable of correcting the packet identifier information.

7. The broadcast receiving method according to claim 6, further comprising:
signal processing the detected video data; and
outputting the signal processed video data.

8. The broadcast receiving method according to claim 6, wherein the correction information is inserted into a reserved area of a PMT (Program Map Table) of the broadcast signal.

9. The broadcast receiving method according to claim 6, wherein the broadcast signal is a Clear QAM (Quadrature amplitude modulation) signal.

10. The broadcast receiving method according to claim 6, wherein the broadcast signal further comprises audio data, wherein the broadcast receiving method further comprises:
detecting the error information for determining whether there is the error in packet identifier information, regarding the audio data and the correction information for correcting the packet identifier information, from the broadcast signal;
correcting the packet identifier information regarding the audio data using the correction information, when it is determined that the error occurs in the packet identifier information regarding the audio data; and
detecting the audio data using the corrected packet identifier information.

11. A broadcast transmitting apparatus comprising:
a broadcast signal generator configured to generate a broadcast signal which comprises video data; and
a transmitter configured to transmit the broadcast signal,
wherein the broadcast signal comprises error information for determining whether there is an error in packet identifier information, regarding the video data and correction information for correcting the packet identifier information,
wherein the error is inserted to the packet identifier information to distinguish a broadcast receiving apparatus which is capable of correcting the packet identifier information.

12. The broadcast transmitting apparatus according to claim 11,
wherein the correction information is inserted into a reserved area of a PMT (Program Map Table) of the broadcast signal.

13. The broadcast transmitting apparatus according to claim 11,
wherein the broadcast signal is a Clear QAM (Quadrature amplitude modulation) signal.

14. A broadcast transmitting method comprising:
generating a broadcast signal which comprises video data;
inserting error information, for determining whether there is an error in packet identifier information, regarding the video data and correction information for correcting the packet identifier information, into the broadcast signal; and
transmitting the broadcast signal,
wherein the error is inserted to the packet identifier information to distinguish a broadcast receiving apparatus which is capable of correcting the packet identifier information.

15. The broadcast transmitting method according to claim 14,
wherein the broadcast signal is a Clear QAM (Quadrature amplitude modulation) signal.

16. A broadcast transmitting method comprising:
generating a broadcast signal which comprises video data;
inserting correction information into a PMT (Program Map Table) of the broadcast signal; and
transmitting the broadcast signal,
wherein the broadcast signal comprising the correction information indicates that there is an error in packet identifier information of the broadcast signal regarding the video data
wherein the error is inserted to the packet identifier information to distinguish a broadcast receiving apparatus which is capable of correcting the packet identifier information.

17. The broadcast transmitting method according to claim 16, wherein the broadcast signal is a Clear QAM (Quadrature amplitude modulation) signal.

18. The broadcast transmitting method according to claim 16, wherein the correction information is inserted into a reserved area of the PMT of the broadcast signal.

19. The broadcast transmitting method according to claim 16, wherein when the broadcast signal further comprises audio data, the correction information indicates whether there is an error in the packet identifier information regarding the audio data.

* * * * *